INVENTOR
Richard J. Chen
and
Nicholas Gold
Brown and Mikulka
and
Alfred E. Corrigan
ATTORNEYS

United States Patent Office 3,496,845
Patented Feb. 24, 1970

3,496,845
METHOD OF INDICATING A RELOADING CONDITION IN PHOTOGRAPHIC APPARATUS
Richard J. Chen, Winchester, and Nicholas Gold, Arlington, Mass., assignors to Polaroid Corporation, Cambridge, Mass., a corporation of Delaware
Filed July 6, 1967, Ser. No. 651,495
Int. Cl. G03b 17/24
U.S. Cl. 95—1.1                                    4 Claims

ABSTRACT OF THE DISCLOSURE

A method of indicating a reloading condition in photographic apparatus wherein a trailing end section of a sheet of photosensitive material is pre-exposed to form a latent indicia therein prior to its insertion into the photographic apparatus. The apparatus includes a station for exposing and processing and severing successive sections of the sheet for subsequent delivery thereof to the user of the apparatus. A switch, e.g., is provided for prohibiting any further severing of the sheet upon detecting the trailing edge of the sheet thereby insuring that the penultimate section of the sheet and the trailing end section of the sheet are processed as a unit and delivered to the user. Processing of these latter sections develops the image in the penultimate section of the indicia in the trailing end section thereby notifying the user of the apparatus that the supply of sheet material should be replenished.

---

Photographic apparatus of the type comprehended by the present invention generally includes means for exposing successive areas of a light-sensitive, image-recording sheet to light from a subject such as a document, page of a book, photograph, etc.; cutting the exposed image-recording sheet into sections each including an exposed area; and treating each of the sections with a liquid processing agent to form a visible (positive) image of the subject. The exposure system of the apparatus generally comprises means for supporting successive sections of the photosensitive sheet in position for exposure, means for locating a subject in position for exposure, means for illuminating the subject, and an optical system including an objective lens for producing an image of the subject on the section of the photosensitive sheet positioned for exposure. The processing system includes means for severing each exposed section of the photosensitive sheet from the remainder of the sheet and applying a liquid processing agent to the exposed area of each section to effect visible image formation.

In photographic apparatus of the foregoing type, a section of the photosensitive sheet is exposed for producing a latent image of the subject on the photosensitive sheet. The exposed section which has its leading edge adjacent a knife and anvil and its trailing edge adjacent feed rolls is then advanced by the rolls past a knife and anvil to a liquid applicator where a processing liquid is applied to the exposed section. The sheet is advanced past the liquid applicator until its leading edge is detected by a switch, whereupon the knife is activated to sever said section from said sheet. The severed section is then advanced to a delivery station.

A problem with photographic apparatus of the type described above is determined when the supply of photosensitive material is substantially exhausted in order that the operator may replenish the supply. One attempt at solving this problem has been to print an appropriate indicia at the end of the photosensitive material. However, this presents the problem of applying the ink to a stamp, moving the stamp into contact with the photosensitive material and returning the stamp to its original position.

Also, the rate at which the photosensitive material can be manufactured is limited by the rate at which the printed indicia can be applied to the material.

Accordingly, an object of the present invention is to provide, in photographic apparatus of the type described, novel means for indicating a sheet reloading condition.

Another object of the present invention is to provide a more efficient means of applying indicia to photosensitive material.

Other objects of the invention will in part be obvious and will in part appear hereinafter.

The invention accordingly comprises the method involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

The invention is especially designed for incorporation in photographic apparatus in which light-sensitive, image-recording sheet material is exposed and processed to produce visible images. The apparatus may take the form of a camera, document duplication apparatus, a printer, or the like, for performing any of a variety of image-forming processes. For purposes of illustration, the invention is described and shown as incorporated in document-copying apparatus adapted to be employed with an integral image-recording and image-receiving sheet comprising a support such as paper, at least one layer containing a light-sensitive material such as a silver halide emulsion, and an outer layer comprising a translucent material such as finely divided titanium dioxide, dispersed in a suitable permeable colloidal carrier or matrix, such as gelatin, which is permeable to an aqueous processing liquid. The translucent pigment may be incorporated in a layer containing a light-sensitive material and/or may comprise a separate outer layer which may also contain silver precipitating nuclei and is sufficiently transparent to permit exposure of the light-sensitive layer therebeneath, while at the same time being sufficiently opaque to provide a requisite background for a positive silver image transfer thereto by diffusion and to mask a negative image formed thereunder. Processing of the exposed image-recording sheet is accomplished by applying an aqueous liquid including a silver halide developer and a silver halide complexing agent to the side of the sheet opposite the support so as to impregnate the light-sensitive layer with sufficient processing liquid to produce a positive silver transfer image on the surface of the translucent layer.

Combined image-recording and image-receiving sheet materials of the foregoing type and processes performed therewith are described in detail in copending U.S. application of Edwin H. Land, Ser. No. 519,995, and in U.S. application of Edwin H. Land et al., Ser. No. 519,884, both filed on Jan. 11, 1966.

Figure 1:
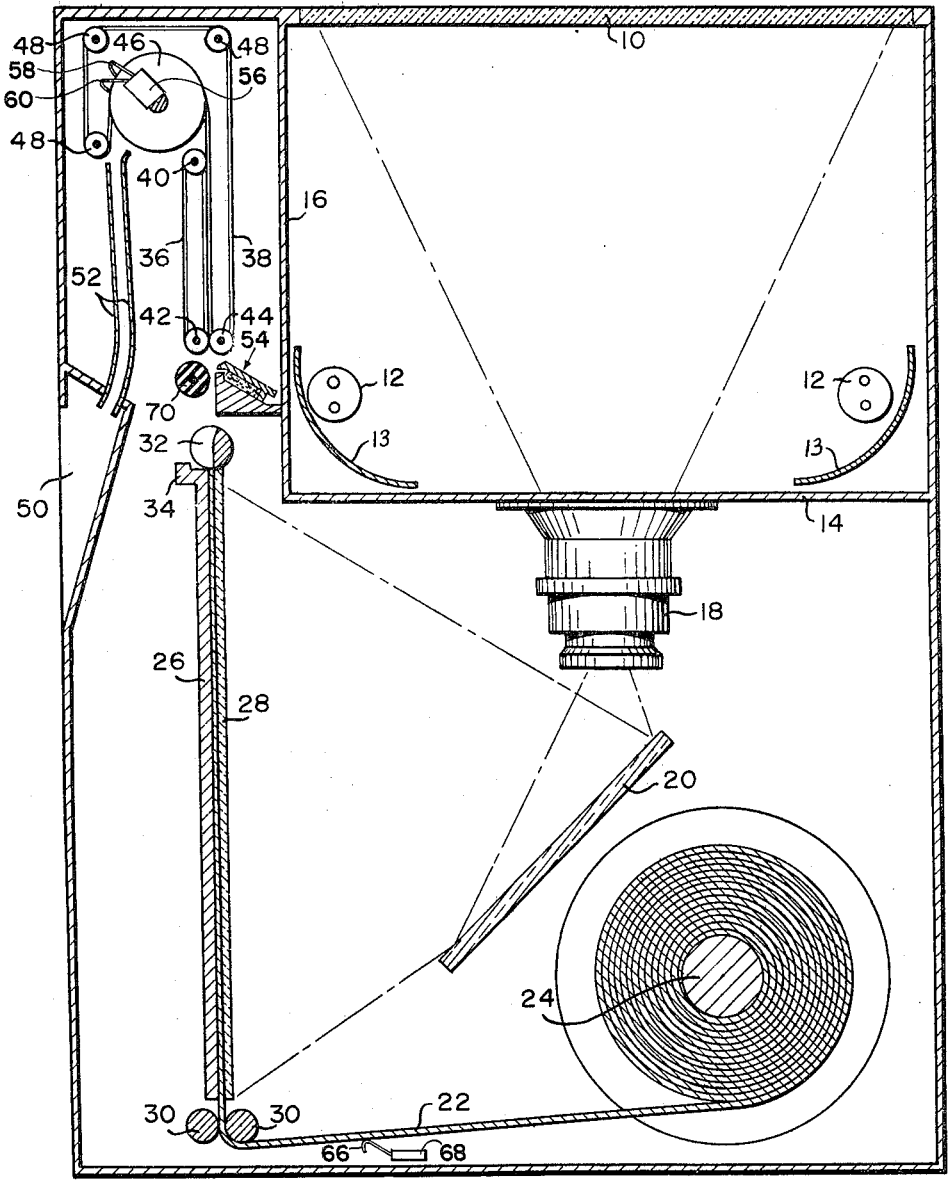
FIGURE 1 is a sectional, elevational view of photographic document-copying apparatus embodying the invention.

Reference is now made to FIGURE 1 of the drawings wherein there is illustrated document-copying apparatus embodying the invention. The document copier comprises means for exposing successive areas of a combined image-recording and image-receiving sheet, severing successive sections of the sheet, each containing an exposed area, from the remainder of the sheet and means for processing the successive sections of the sheet including means for applying a nonviscous (e.g., viscosity of water) liquid reagent to one side of each of the sections.

The apparatus comprises exposure means including a window 10 in the upper wall of the housing of the apparatus for supporting an original, e.g., document, in position for exposure to light from lamp 12 and reflectors 13 mounted within an enclosed chamber separated from the remainder of the interior of the housing by a lower wall 14 and a side wall 16. Light reflected from an original positioned on window 10 is transmitted by a conventional objective lens, part of a lens and shutter assembly 18 toward a focal plane in the apparatus at which the lens forms an image of the original. The optical system includes, in addition to the lens of assembly 18, a mirror 20 positioned beneath the lens for reflecting light toward one side of the housing and means for supporting a light-sensitive, image-recording sheet at the focal plane of the lens.

A supply of light-sensitive, image-recording sheet material, designated 22, is provided coiled on a spool 24 in the lower portion of the apparatus behind mirror 20. The means for positioning successive sections of the sheet in position for exposure include a support plate 26 and juxtaposed transparent plate 28 located in a vertical plane with the surface of the transparent plate located substantially at the focal plane of the lens. Sheet 22 is withdrawn from spool 24 and moved upwardly between plates 26 and 28 by a pair of juxtaposed feed rolls 30 located beneath and adjacent to the lower edges of the plates.

A rotary knife 32 and anvil 34 are mounted above and adjacent the upper edges of plates 26 and 28 for severing successive exposed sections of the image-recording sheet as each section is advanced upwardly from between the plates between the knife and anvil. In the operation of the apparatus, a section of the image-recording sheet positioned between plates 26 and 28 is advanced, following exposure, upwardly past the knife between a backing roll 70 and a liquid applicator means 54 and then through a sheet conveyor system designed to deliver the sheets from the applicator to an exit opening in the housing of the apparatus and to provide a delivery period of sufficient duration to permit completion of the processing of the image-recording sheet within a dark environment. Backing roll 70 preferably has a surface having a high coefficient of friction, e.g., an elastomer such as polyurethane. Means are provided for rotating roll 70 (in a counterclockwise direction) for supporting and moving a sheet past the capillary channel in applicator 54. The sheet delivery system includes two sets of endless conveyor belts 36 and 38. The belts 36 are mounted on support rolls 40 and 42, and belts 38 extend from support rolls 44, juxtaposed with support roll 42, upwardly in juxtaposition with belts 36 and around an enlarged drum or discs 46 and thence back to support roll 44 by way of support rolls 48 spaced around the periphery of drum or discs 46. Appropriate means (not shown) are provided for rotating the various rolls and drum or discs 46. The conveyor belts 38 which contact the side of the sheets to which the liquid is applied are preferably quite narrow in order to limit the area of contact between the belts and the sheet, and, in the preferred form, may comprise conventional O-rings.

The housing of the apparatus includes an opening or delivery station 50 through which the processed sheets are delivered and a pair of guides 52 extending from the opening upwardly toward the points of tangency between belts 38 and discs 46 for guiding the sheets from between the belts and discs downwardly through opening 50.

Rotation of all of the sheet-advancing rolls and belts is coordinated to insure movement of the sheet material at a constant predetermined speed particularly during processing, including liquid application and the subsequent processing period.

Mounted coaxially of drum or discs 46 is a switch box 56 having detecting members 58, 60. Switch box 56 contains switches 62, 64 connected respectively with detecting members 58, 60. Detecting members 58, 60 are positioned in the path of travel of each section of sheet 22 and are engageable by the leading edge of each section of sheet 22 for actuating the respective switches. Mounted adjacent feed rolls 30 is a third detecting member 66 connected to a switch 68. Detecting member 66 is also located in the path of travel of sheet 22 and is responsive to the approach of the trailing edge of sheet 22 toward rolls 30 for actuating switch 68.

Switch 68 is held in a closed position by the tautness of sheet 22, i.e., when the sheet material is held taut between feed rolls 30 and spool 24, switch 68 is maintained in a closed position due to its contact therewith. When sheet 22 is substantially exhausted, its trailing edge will fall from spool 24, thereby removing the tautness and allowing detecting member 66 to move switch 68 to its normally open position.

Figure 2:
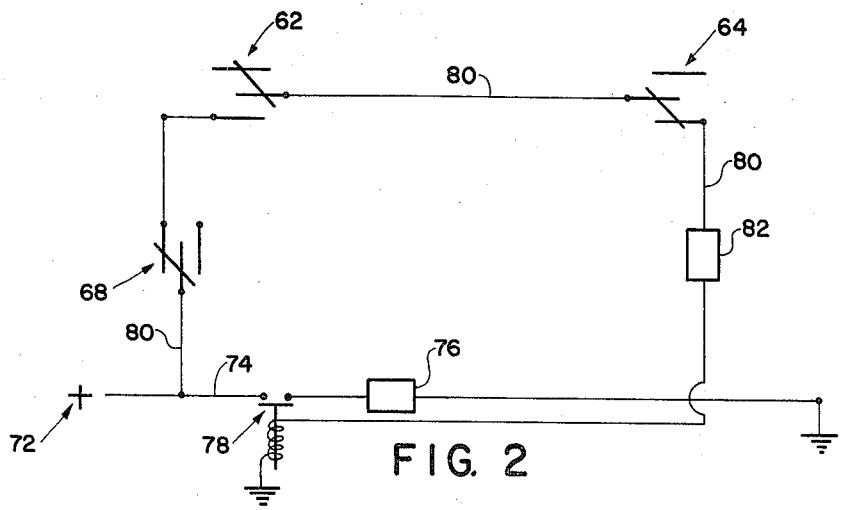
FIG. 2 is a schematic representation of a circuit usable in the invention.
Figure 3:
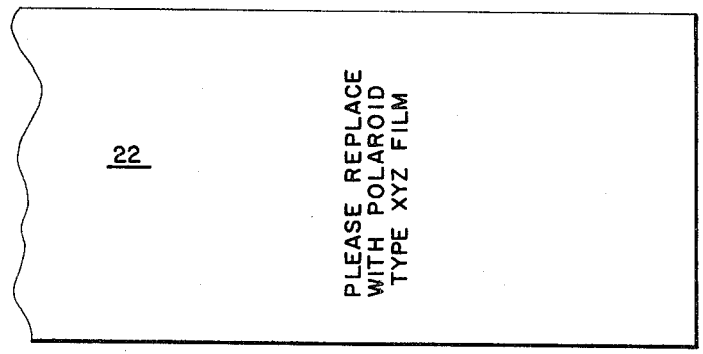
FIG. 3 is a plan view of a trailing end section of a photosensitive sheet showing the pre-exposed section subsequent to the formation of a visible indicia therein.
Figure 4:
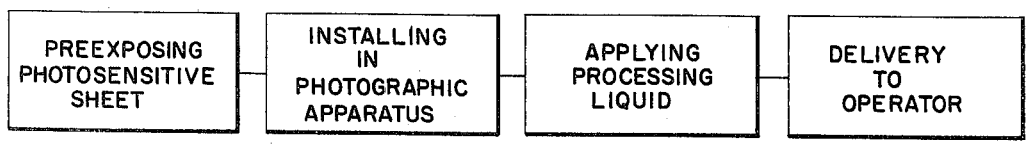
FIG. 4 shows a flow chart embodying the invention.

A clear understanding of the function of detecting members 58, 60, 66 and switches 62, 64 and 68 may be had by reference to FIG. 2 of the drawings wherein is shown a schematic representation of a circuit usable in the instant invention. Starting with a source of power 72 we have a line 74 connected to a clutch motor 76 which in turn is in engagement with drive rolls 30 when current is flowing through the clutch motor 76. The flow of current through line 74 is controlled by a relay 78 which may be manually set to allow for the flow of current through line 74 and clutch motor 76 and electromagnetically moved to a nonconducting position as will be more clearly explained hereinafter.

Connected in parallel with line 74 is line 80 which connects switches 68, 62 and 64 in series with relay 78 and with a knife solenoid 82.

In operation of the photographic apparatus, the elements of the circuit of FIG. 2 are in the position shown, i.e., switch 64 is normally in a closed position, switch 62 is in a normally open position, switch 68 in a closed position and relay 78 is normally in a nonconducting position. When it is desired to make a copy of an object placed on window 10, relay 78 is moved to the conducting position at substantially the same time as the shutter mechanism is tripped. Movement of relay 78 to the conducting position allows line 74 to conduct a flow of current from source 72 through line 74 and clutch motor 76 to start rotation of feed rolls 30. At this time no current is allowed to flow through line 80 because switch 62 is still in the open position. The exposed section of sheet 22 is moved upwardly by rolls 30 between cutter or knife 32 and anvil 34, between backing roll 70 and liquid applicator 54 where a supply of processing liquid is applied to the exposed section and between belts 36, 38. From between belts 36, 38 the exposed section passes around drum or discs 46 until the leading edge of the exposed section is detected by detecting element 58. When detecting element 58 detects the leading edge of the exposed section of sheet 22, it (the detecting element 58) moves switch 62 to a closed position, thereby allowing a flow of current through line 80. The flow of current through line 80 activates knife solenoid 82 to thereby actuate knife 32 which severs the exposed section from the sheet 22 and simultaneously moves relay 78 to the nonconducting position stopping the flow of current through clutch motor 76 to thereby stop feed rolls 30. The severed exposed section is further advanced along its path of travel until detecting element 60 detects the leading edge of the severed section. Upon detecting the leading edge of said severed section, detecting element 60 moves switch 64 to an open position, thereby preventing any further activation of knife solenoid 82 until said section completely passes detecting element 60. Switch 62 remains in the closed position until the trailing end of the severed section of sheet 22 passes detecting element 58, at which time switch 62 is moved to its normally open position. Switch 64 will remain in the open position until the trailing end of the severed section has passed detecting element 60, at which time switch 64 will return to its normally closed position.

Accordingly, it is apparent that as long as detecting element 60 detects the severed exposed sheet, line 80 is maintained in an open condition, thereby preventing flow of current through the knife solenoid 82 regardless of whether switch 62 is again moved to the closed position as a result of its associated detecting element 58 detecting the leading edge of another exposed sheet. The exposed section finally emerges from the photographic apparatus via opening 50.

To provide a means for indicating to the operator of the apparatus that the supply of sheet material 22 has to be replenished, a trailing end section of the sheet is pre-exposed with suitable indicia. The sheet material including said pre-exposed section is inserted into the apparatus. Successive sections of said sheet 22 are photoexposed, processed and advanced to the delivery station 50. As will be more clearly explained hereinafter, a penultimate section and the pre-exposed section are processed as a unit. Processing liquid is applied to the unit by applicator 54 to form diffusible image-forming substances and transfer the image-forming substances to an outer pigmented stratum of said penultimate and pre-exposed sections for forming at least a visible indicia image on said pre-exposed section. The pre-exposed and penultimate sections are then advanced to delivery station 50 where the operator is appraised of the fact that a new sheet of photosensitive material should be inserted into the apparatus.

It will be noted that detecting element 66 maintains switch 68 in the position shown in FIG. 2 as long as detecting element 66 detects a tautness in sheet 22. Upon detecting the approach of the trailing edge of sheet 22 toward feed rolls 30, detecting element 66 moves switch 68 from the position shown in FIG. 2 wherein it conducts a flow of current through switches 62, 64, knife solenoid 82 and relay 78 to a normally open position. Accordingly, it can be seen that when the leading edge of the unit comprised of the penultimate and pre-exposed sections of sheet 22 is detected by detecting element 58, the knife solenoid cannot be energized due to line 80 being open between switches 68 and 62; also, current is prevented from flowing through the winding of relay 78, thereby maintaining it in a conducting position to allow the feed rolls 30 to operate until the unit is transported through the apparatus. This insures that the processed pre-exposed section is advanced to delivery station 50.

Since certain changes may be made in the above method without departing from the scope of the invention herein involved, it is intended that all matter contained in the above description or shown in the accompanying drawings shall be interpreted as illustrative and not in a limiting sense.

What is claimed is:

1. A method of indicating a sheet reloading condition in photographic processing apparatus of the type utilizing a sheet of photosensitive image-recording material, said apparatus having means for photoexposing successive sections of said sheet, advancement means including a relay circuit for sequentially moving said sections into position for exposure and moving exposed sections of said material through a processing station wherein a processing liquid is applied to said exposed sections to form a visible image thereon, cutting means for severing each said section and detecting means responsive to the approach in the trailing end of said sheet towards said advancement means for preventing activation of said cutting means and deactivation of said advancement means until the trailing end portion of said sheet has been advanced from said apparatus; said method comprising the steps of:
 pre-exposing a section of said sheet near a trailing end thereof to form a latent indicia image thereon;
 inserting said sheet including said pre-exposed trailing end section into said apparatus;
 exposing the penultimate section of said sheet;
 applying a processing liquid to said penultimate section and said pre-exposed section as a unit to form a visible indicia image on said pre-exposed section; and
 advancing said penultimate section and said pre-exposed section to a delivery station.

2. The method of claim 1 further comprising the step of detecting the approach of the trailing edge of said sheet towards said advancement means and deactivating said cutting means.

3. The method of claim 2 further comprising the step of opening said relay circuit to maintain said advancement means in an activated phase and thereby continue advancement of said pre-exposed section from said apparatus.

4. The method of indicating a sheet reloading condition in photographic apparatus of the type utilizing a single composite sheet comprising a support and at least a layer on said support including a strata containing a photosensitive image-recording material and an outer pigmented strata for supporting a visible image formed by outward diffusion of transferable image-forming substances from said strata containing said image-recording material toward the surface of said pigmented strata, said apparatus having an exposure station, a processing station and advancing means for moving successive sections of said sheet through said apparatus, said method comprising the steps of:
 pre-exposing a section of said sheet near the trailing end thereof to form a latent indicia image thereon;
 inserting said sheet including said pre-exposed section into said apparatus;
 photoexposing a penultimate section of said sheet;
 applying a processing liquid to said penultimate section and said pre-exposed section as a unit to form diffusible image-forming substances and transfer said image-forming substances to said outer pigmented strata of said penultimate and pre-exposed sections for forming at least a visible indicia image on said pre-exposed section; and
 advancing said penultimate and pre-exposed sections as a unit to a delivery station.

References Cited

UNITED STATES PATENTS 3,427,658  2/1969  Roberts _____ 355—13 X

JOHN M. HORAN, Primary Examiner